United States Patent
Suzuki et al.

(10) Patent No.: US 11,298,749 B2
(45) Date of Patent: Apr. 12, 2022

(54) CUTTING INSERT, HOLDER, AND CUTTING TOOL THAT INCLUDES CUTTING INSERT

(71) Applicant: TUNGALOY CORPORATION, Fukushima (JP)

(72) Inventors: Yuusuke Suzuki, Iwaki (JP); Katsura Mochizuki, Iwaki (JP)

(73) Assignee: TUNGALOY CORPORATION, Iwaki (JP)

( * ) Notice: Subject to any disclaimer, the term of this patent is extended or adjusted under 35 U.S.C. 154(b) by 124 days.

(21) Appl. No.: 16/353,826

(22) Filed: Mar. 14, 2019

(65) Prior Publication Data

US 2019/0283142 A1    Sep. 19, 2019

(30) Foreign Application Priority Data

Mar. 15, 2018   (JP) .............................. JP2018-047637

(51) Int. Cl.
| | |
|---|---|
| *B23B 27/16* | (2006.01) |
| *B23B 27/14* | (2006.01) |
| *B23B 51/04* | (2006.01) |
| *B23B 27/00* | (2006.01) |

(Continued)

(52) U.S. Cl.
CPC .......... *B23B 27/145* (2013.01); *B23B 27/007* (2013.01); *B23B 27/1618* (2013.01); *B23B 27/1622* (2013.01); *B23B 29/02* (2013.01); *B23B 51/00* (2013.01); *B23B 51/0466* (2013.01); *B23B 2200/0447* (2013.01); *B23B 2200/201* (2013.01); *B23B 2200/204* (2013.01); *B23B 2200/286* (2013.01); *B23B 2200/321* (2013.01); *B23B 2200/3618* (2013.01); *B23B 2205/045* (2013.01); *B23B 2251/50* (2013.01)

(58) Field of Classification Search
CPC .............. B23B 27/145; B23B 27/1622; B23B 2200/0447; B23B 2200/3618; B23B 2205/045; B23B 27/143
See application file for complete search history.

(56) References Cited

U.S. PATENT DOCUMENTS

| | | | |
|---|---|---|---|
| 3,902,232 A | | 9/1975 | Hertel |
| 4,312,250 A | * | 1/1982 | Yankoff ................ B23B 27/143 407/114 |

(Continued)

FOREIGN PATENT DOCUMENTS

| | | |
|---|---|---|
| DE | 2102479 A1 | 8/1972 |
| JP | H11-000813 A | 1/1999 |

(Continued)

*Primary Examiner* — Alan Snyder
(74) *Attorney, Agent, or Firm* — Studebaker & Brackett PC

(57) ABSTRACT

There is provided a cutting insert used for both drilling and turning. The cutting insert includes an insert main body having a front surface and a rear surface, the outline shapes of which are parallelogram shapes, peripheral side surfaces disposed on four sides of the insert main body, cutting edges provided on respective intersecting ridge lines between the front surface and the peripheral side surface and between the rear surface and the peripheral side surface of the insert main body, and a hole provided in the insert main body to incline with respect to the front surface and the rear surface, the hole being usable for attachment.

11 Claims, 13 Drawing Sheets

(51) Int. Cl.
*B23B 29/02* (2006.01)
*B23B 51/00* (2006.01)

(56) References Cited

U.S. PATENT DOCUMENTS

| | | | |
|---|---|---|---|
| 8,287,213 B2 * | 10/2012 | Kramer | B23C 5/06 407/113 |
| 10,010,940 B2 * | 7/2018 | Hirano | C22C 26/00 |
| 10,040,125 B2 * | 8/2018 | Matsuda | B23B 27/143 |
| 2011/0305534 A1 | 12/2011 | Park et al. | |
| 2012/0282047 A1 | 11/2012 | Choi et al. | |
| 2013/0272808 A1 * | 10/2013 | Cohen | B23B 27/143 407/116 |
| 2016/0023285 A1 | 1/2016 | Saji | |
| 2017/0320142 A1 * | 11/2017 | Lach | B33Y 70/00 |

FOREIGN PATENT DOCUMENTS

| | | | | |
|---|---|---|---|---|
| JP | 2012-516244 A | 7/2012 | | |
| JP | 2012-232350 A | 11/2012 | | |
| JP | 2013-514899 A | 5/2013 | | |
| JP | 2016-052709 A | 4/2016 | | |
| WO | 2010/117728 A2 | 10/2010 | | |
| WO | 2013/105770 A1 | 7/2013 | | |
| WO | WO-2013105770 A1 * | 7/2013 | | B23B 27/1622 |
| WO | 2014/148515 A1 | 9/2014 | | |

* cited by examiner

CUTTING INSERT, HOLDER, AND CUTTING TOOL THAT INCLUDES CUTTING INSERT

BACKGROUND

Field

The present invention relates to a cutting insert, a holder, and a cutting tool that includes the cutting insert.

Description of Related Art

Multifunction cutting tools that enable drilling, internal turning and external turning have been proposed. Examples of the multifunction cutting tools in the past include a cutting tool having a main body with a shape similar to that of a indexable insert drill (see, for example, FIG. 2, claim 3, and the like of Japanese Translation of PCT Application No. 2012-516244).

SUMMARY

However, in the cutting tool in the past described above, a cutting insert shifts during cutting and tool rigidity is low compared with a single-function tool.

Therefore, an object of the present invention is to provide a cutting insert that can solve these problems, a holder to which the cutting insert can be attached, and a cutting tool that includes the cutting insert.

An aspect of the present invention is a cutting insert used for both drilling and turning, the cutting insert including: an insert main body having a front surface and a rear surface, the outline shapes of which are parallelogram shapes; peripheral side surfaces disposed on four sides of the insert main body; cutting edges provided on respective intersecting ridge lines between the front surface and the peripheral side surface and between the rear surface and the peripheral side surface of the insert main body; and a hole provided in the insert main body to incline with respect to the front surface and the rear surface, the hole being usable for attachment.

In the cutting insert described above configuring the multifunction cutting tool, opposing peripheral side surfaces can be configured by two sets of surfaces in a parallel or nearly parallel state each other. In the cutting insert having such a configuration, it is easy to secure insert thickness (the distance between the front surface and the rear surface). That is, in the case of a cutting insert having a taper shape such as a trapezoidal shape in side view, it could occur that, when the insert thickness is increased, the cutting insert is reduced in the width direction to be gradually narrower and thickness around a hole becomes insufficient. On the other hand, when the opposing peripheral side surfaces are in the parallel or nearly parallel state, it is easy to prevent the thickness around the hole from becoming excessively small. Therefore, it is possible to increase the insert thickness while preventing the thickness around the hole from becoming excessively small. If the insert thickness can be increased, rigidity can be increased. For example, it is possible to realize a configuration that is, for example, less easily fractured compared with the cutting insert having the trapezoidal shape in side view in the past.

The insert thickness (including the thickness around the hole) is explained below more in detail. In the cutting insert of the aspect of the present invention, an increase in the insert thickness is less disadvantageous from conditions or reasons described in (i) to (v) below. Therefore, the aspect of the present invention is suitable for realizing a cutting insert increased in insert thickness in a multifunction tool.

(i) When a positive insert in turning is increased in thickness, a supporting surface retracts from a cutting corner by an angle (a clearance angle) of a flank.

(ii) In many indexable insert drills in the past, two inserts are used in a center edge and an outer peripheral edge. It is desirable in terms of fracture resistance to set the center edge side to axially descend (set the cutting edge lower than the tool center) and set the outer peripheral edge side to axially ascend (set the cutting edge higher than the tool center).

(iii) In general, when two cutting inserts (cutting blades) are used, a chip discharge groove is required for each, so that the sectional area of the groove increases, then the sectional area of the tool decreases and the rigidity of the tool decreases. When two inserts are used in the multifunction tool in this aspect, the rigidity of the tool main body excessively decreases compared with the single-function tool during the turning. Therefore, in the insert, a center edge and an outer peripheral edge need to be mounted on one cutting edge.

(iv) To satisfy the above (ii) on one cutting edge, the height of the cutting edge needs to be reduced toward the tool center during tool mounting. The insert desirably inclines such that the cutting edge becomes higher toward the tool outer side.

(v) The insert having the cutting edge of the above (iv) needs to have sufficient thickness on the center edge side. However, when sufficient thickness is given to the positive insert, the distance between the cutting edge and the hole decreases.

In the cutting insert described above, the axis of the hole inclining with respect to the front surface and the rear surface may be parallel to at least any one of the peripheral side surfaces or a portion of the peripheral side surfaces.

In the cutting insert described above, the axis may be parallel to all of the peripheral side surfaces.

In the cutting insert described above, the cutting edge may be disposed point-symmetrically about a position of a center of the insert main body.

In the cutting insert described above, an angle formed by the front surface or the rear surface and each of the peripheral side surfaces may be 76° to 85° in a vertical cross section passing through a center of arcuate cutting edges respectively provided on the front surface and the rear surface of the insert main body.

In the cutting insert described above, the cutting edge may form an angle of 3° to 15° with respect to the front surface or the rear surface in a vertical view of a vertical cross section of the insert main body passing through a center of cutting edges respectively provided on the front surface and the rear surface of the insert main body.

In the cutting insert described above, the opposing peripheral side surfaces may be surfaces parallel to each other.

In the cutting insert described above, at least two sides may have a shape functioning as the cutting edge in a plan view perpendicular to the front surface or a bottom view perpendicular to the rear surface.

DETAILED DESCRIPTION

Preferred embodiments of a cutting tool according to the present invention are explained in detail below with reference to the drawings.

First Embodiment

Figure 1:
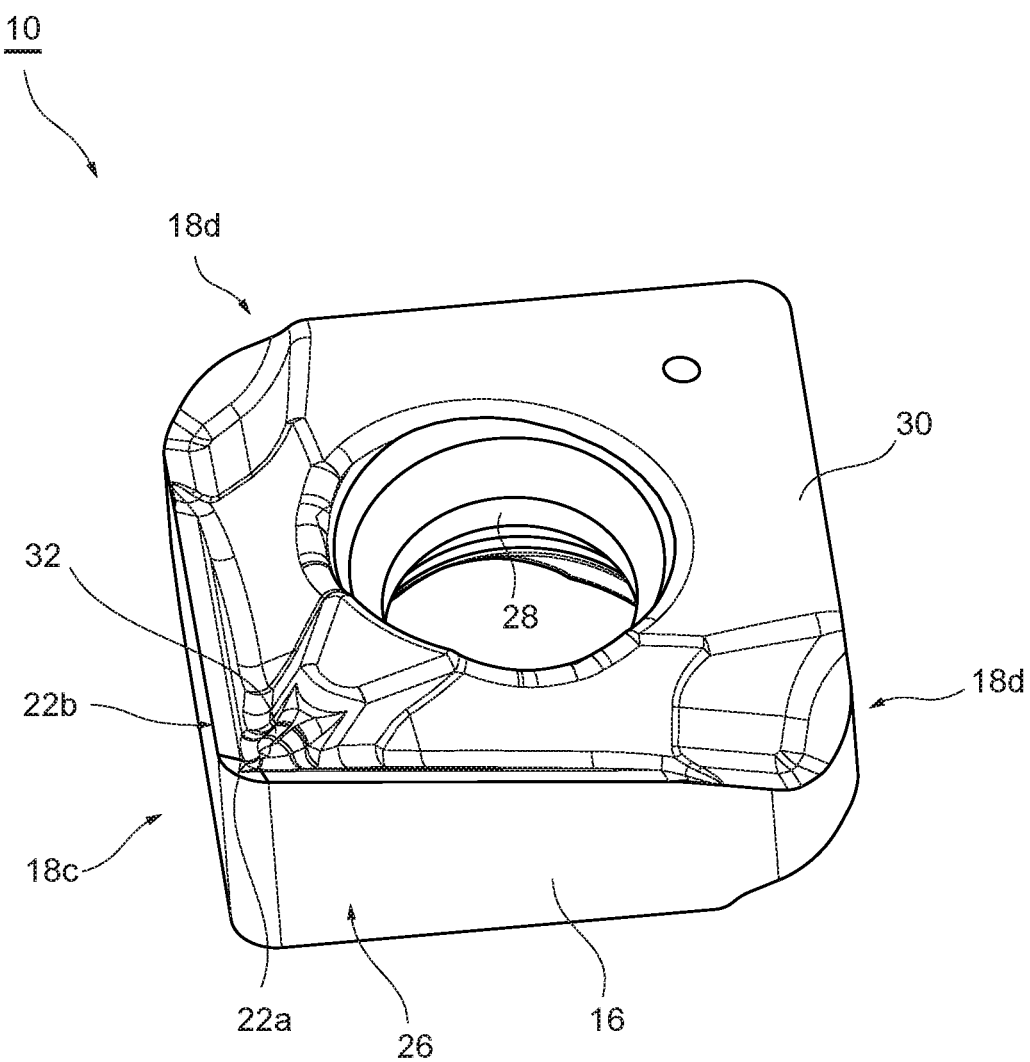
FIG. 1 is a perspective view showing an example of a cutting insert, which is a form of a cutting tool.

A cutting insert 10 according to a first embodiment of the present invention is an insert used for both drilling and turning in one cutting tool, and includes a cutting edge 22 and a hole 28 provided in an insert main body 11 (see FIG. 1 and the like).

Figure 2:
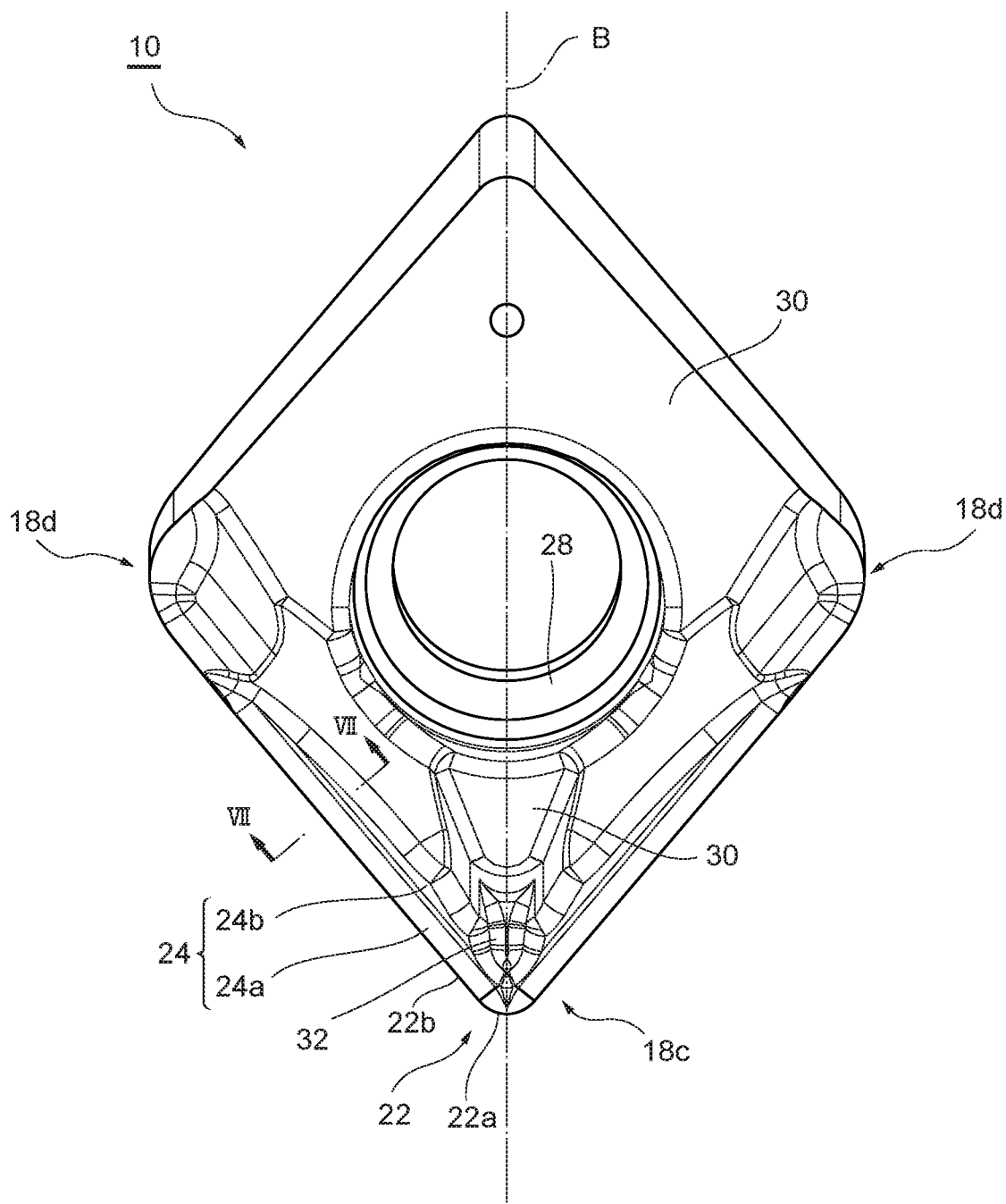
FIG. 2 is a plan view of the cutting insert.

The cutting insert 10 according to this embodiment includes the insert main body 11, the outline shape of which is a parallelogram shape, and has a substantially rhombus plate shape (see FIGS. 1 and 2 and the like). The cutting insert 10 includes two substantially rhombus end faces 12 and 14 opposed to each other and peripheral side surfaces 16 extending between the two end faces 12 and 14.

The peripheral side surfaces 16 are disposed on four sides between the end face 12 and the end face 14 of the insert main body 11. All of the peripheral side surfaces 16 incline with respect to the end faces 12 and 14. In other words, the end faces 12 and 14 incline with respect to a direction parallel to the peripheral side surfaces 16.

In the cutting insert 10, one end face 12 of the two end faces 12 and 14 is, for example, a front surface (in this specification, referred to as upper surface as well; denoted by reference numeral 18 in the following explanation and the drawings). The other end face 14 is a rear surface (in this specification, referred to as lower surface as well; denoted by reference numeral 20 in the following explanation and the drawings) and is configured to function as a seating surface that is in contact with the bottom surface of an insert attachment seat 104 provided in a holder (a cutting tool body) 101 of a cutting tool 100 (see FIG. 12 and the like). The expressions of the front surface (the upper surface) and the rear surface (the lower surface) in this specification are only for convenience. The expressions do not determine disposition in the vertical upward and downward directions and do not prevent the cutting insert 10 from being vertically reversed and used. Concerning a partial cross section of the cutting insert 10, a structure representing one of characteristics in this embodiment is clearly shown in FIG. 8 and the like.

With respect to a ridge line section of a cutting corner section 18c forming an acute angle of the front surface 18, the cutting edge 22 is formed in one cutting corner section 18c of two acute angle portions present on the front surface 18 of the cutting insert 10, and a cutting corner section 18d forming an obtuse angle. The cutting edge 22 includes a corner section forming an acute angle, a corner section forming an obtuse angle, and a linear section. The present invention does not limit the number of cutting edges formed with respect to one end face. The number of cutting edges formed with respect to one end face may be one or may be plural.

In this embodiment, the cutting edge 22 is formed in an intersecting section, in other words, an intersecting ridge line between the front surface 18 and the peripheral side surface 16. The cutting edge 22 extends between a rake face 24 of the front surface 18 and a flank 26 of the peripheral side surface 16. However, the flank 26 substantially forms an acute angle with respect to one end face 12 (the front surface 18) and has a positive clearance angle (see FIG. 4 and the like). The clearance angle is desirably set to 20° or less. In the cutting insert 10 in this embodiment, as an example, the clearance angle is set to 7°. The clearance angle may be partially different. For example, the clearance angle is 14° in a position shown in FIG. 4.

Figure 3:
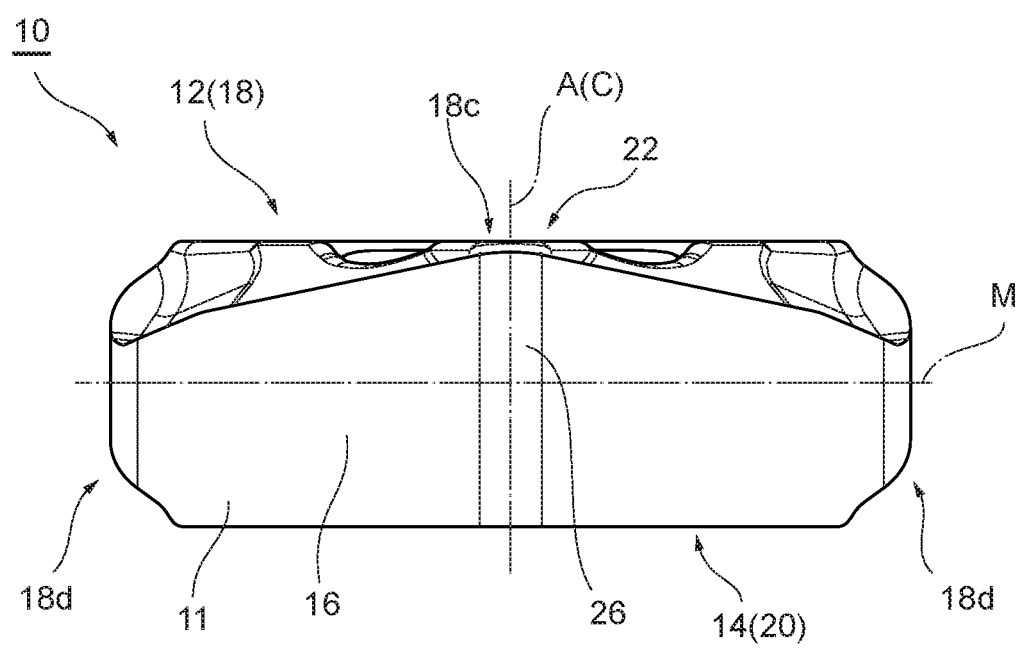
FIG. 3 is a front view (a view from a side where a cutting corner section is present) of the cutting insert.
Figure 4:
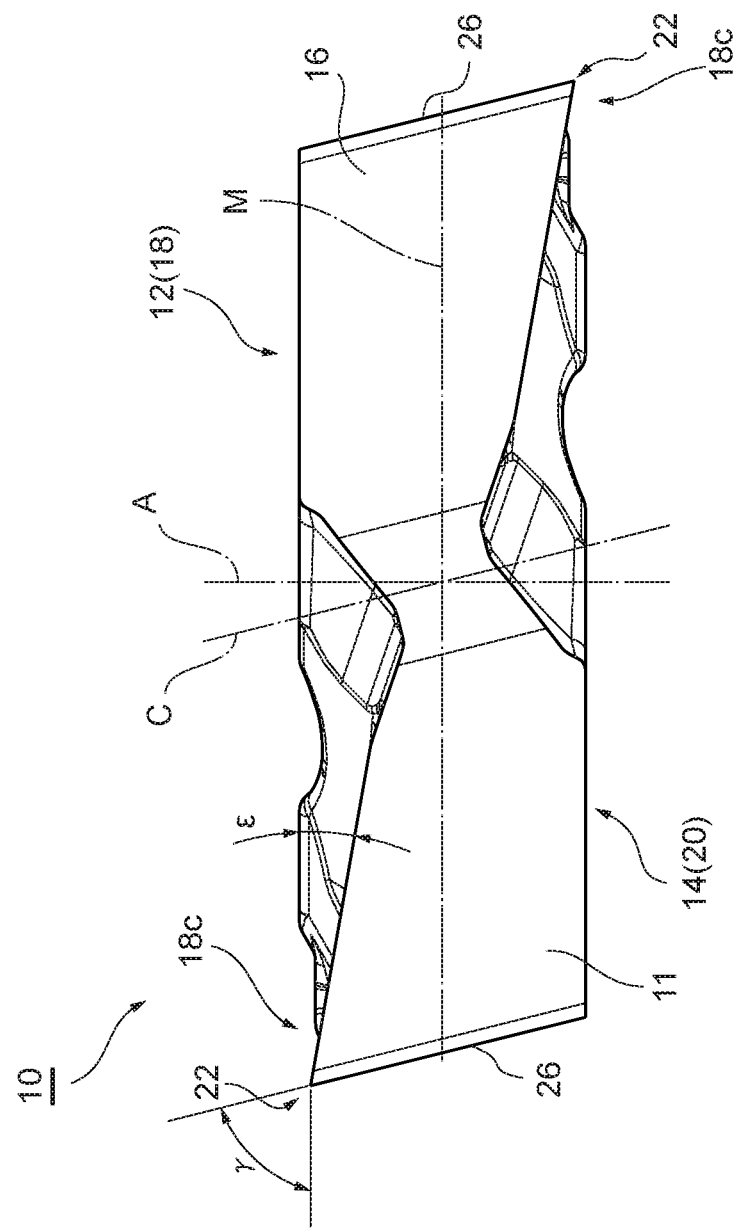
FIG. 4 is a right side view of the cutting insert.
Figure 5:
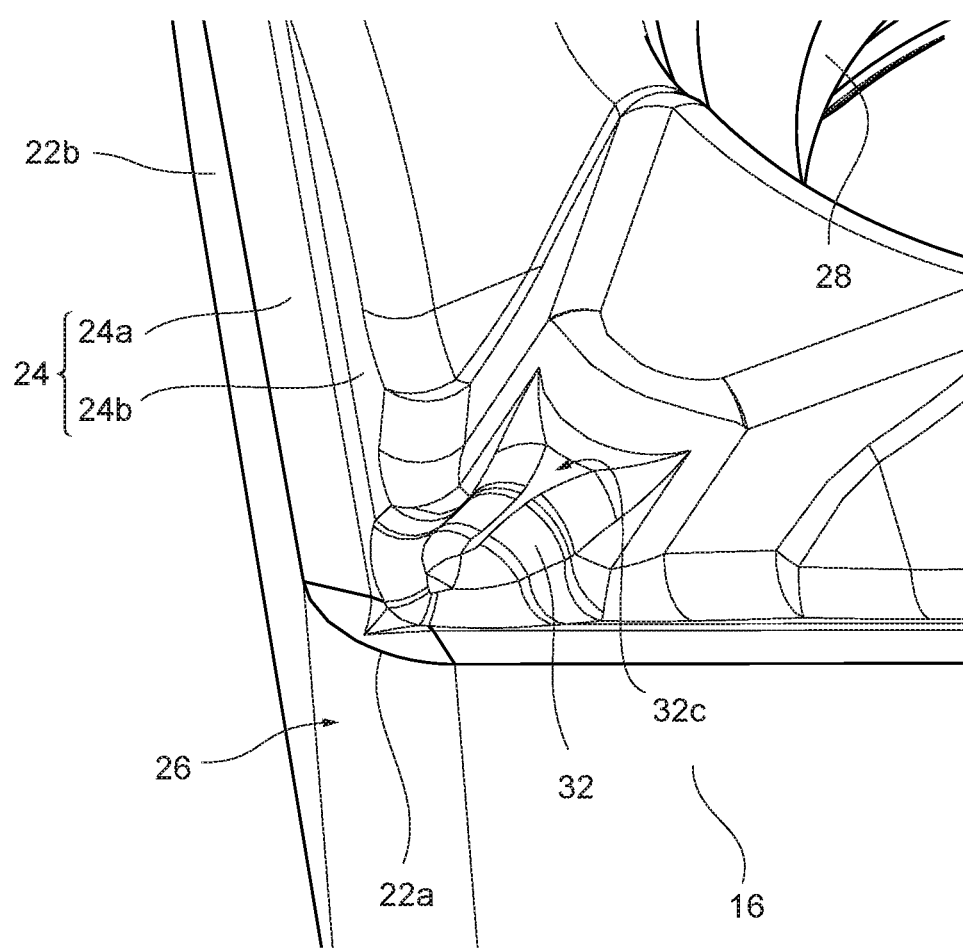
FIG. 5 is an enlarged perspective view of the cutting corner section of the cutting insert.
Figure 6:
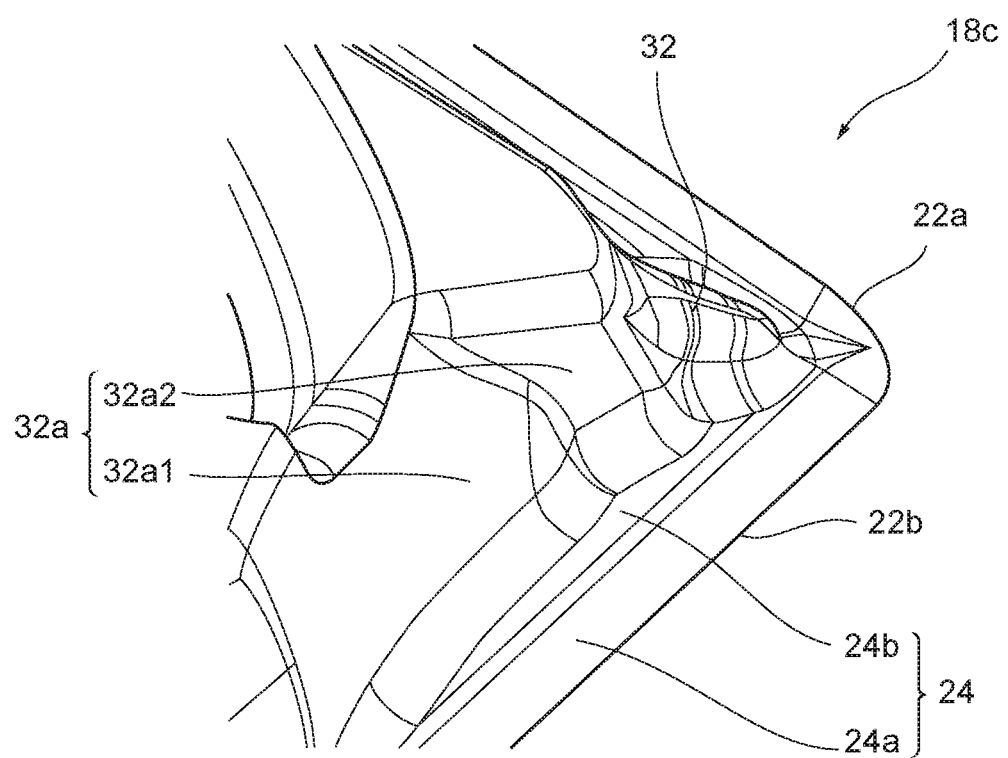
FIG. 6 is an enlarged perspective view of the cutting corner section of the cutting insert viewed from another angle.

The cutting edge 22 on the front surface 18 is formed to incline to approach the rear surface 20 (see FIGS. 3 and 4). An inclination angle viewed from the horizontal direction toward the flank 26 is 7°. The cutting edge 22 includes an arcuate cutting edge 22a and linear cutting edges 22b (see FIGS. 5 and 6). The arcuate cutting edge 22a is formed in the ridge line section of the cutting corner section 18c forming the arcuate angle of the front surface 18. The arcuate cutting edge 22a is formed in an arcuate shape (see FIG. 6 and the like). A preferred range of a curvature radius of an arc forming the arcuate cutting edge 22a is 0.2 mm to 1.2 mm. As an example, in this embodiment, the curvature radius is 0.4 mm.

The cutting edge 22 in the cutting insert 10 in this embodiment is further explained below. When a bisecting plane B (see FIG. 2), which is a vertical cross section of the insert main body 11, passing through the center of the cutting edges 22 respectively provided on the front surface 18 and the rear surface 20 of the insert main body 11 (representatively, the center position of the cutting edges 22 disposed on the left and the right on the front surface 18 and the rear surface 20; in this embodiment, the center position of the arcuate cutting edge 22a) is considered and the vertical cross section by the bisecting plane B is vertically viewed, an angle E of the cutting edge 22 with respect to the front surface 18 or the rear surface 20 is in a range of 3° to 15° (see FIG. 4, which is not a sectional view). In the cutting insert 10 functioning as a multifunction tool used for both drilling and turning in one cutting tool, the range of the angle E is sometimes limited in the shape in the past. However, in the structure in this embodiment, it is possible to eliminate the influence of such limitation and realize an appropriate angle E.

The linear cutting edges 22b extend to be connected to the arcuate cutting edge 22a. The linear cutting edges 22b extend from both ends of the arcuate cutting edge 22a. That is, two linear cutting edges 22b are present for one cutting edge 22. The arcuate cutting edge 22a and the linear cutting edges 22b form the cutting edge 22 that cuts into a material to be cut. The cutting insert 10 described above has a structure in which the linear cutting edges 22b on the two sides functioning as the cutting edge 22 are seen in a plan view perpendicular to the front surface 18 or a bottom view perpendicular to the rear surface 20. Although not particularly shown in the figures, when a plurality of cutting edges 22 are formed with respect to one end face (i.e., the front surface 18 or the rear surface 20), the cutting edges 22 may have a structure in which the linear cutting edges 22b on three or more sides functioning as the cutting edges 22 are seen in the plan view perpendicular to the front surface 18 or the bottom view perpendicular to the rear surface 20.

In the cutting insert 10 in this embodiment, the cutting edges 22 are respectively provided on the front surface 18 and the rear surface 20 of the insert main body 11, the outline shapes of the front surface 18 and the rear surface 20 being the parallelogram shapes. These cutting edges 22 are disposed in positions symmetrical about the center of the insert main body 11, that is, have a 180° rotationally symmetrical shape (see FIG. 4 and the like). In a state of use in which the cutting insert 10 is attached to the holder 101 and one cutting edge 22 is exposed, the other cutting edge 22 is located near an insert attachment surface of the holder 101 and is not exposed (see FIG. 12). Therefore, the cutting edge 22 not in use is less easily damaged. In the cutting insert or the cutting tool having the structure in the past, the cutting corner section not in use exposed in various machining forms could be damaged. On the other hand, such a problem can be solved by the cutting insert 10 in this embodiment. With the cutting insert 10 in this embodiment, it is possible to use the same cutting edge 22 at least twice for the same machining by changing a corner in use.

Figure 13:
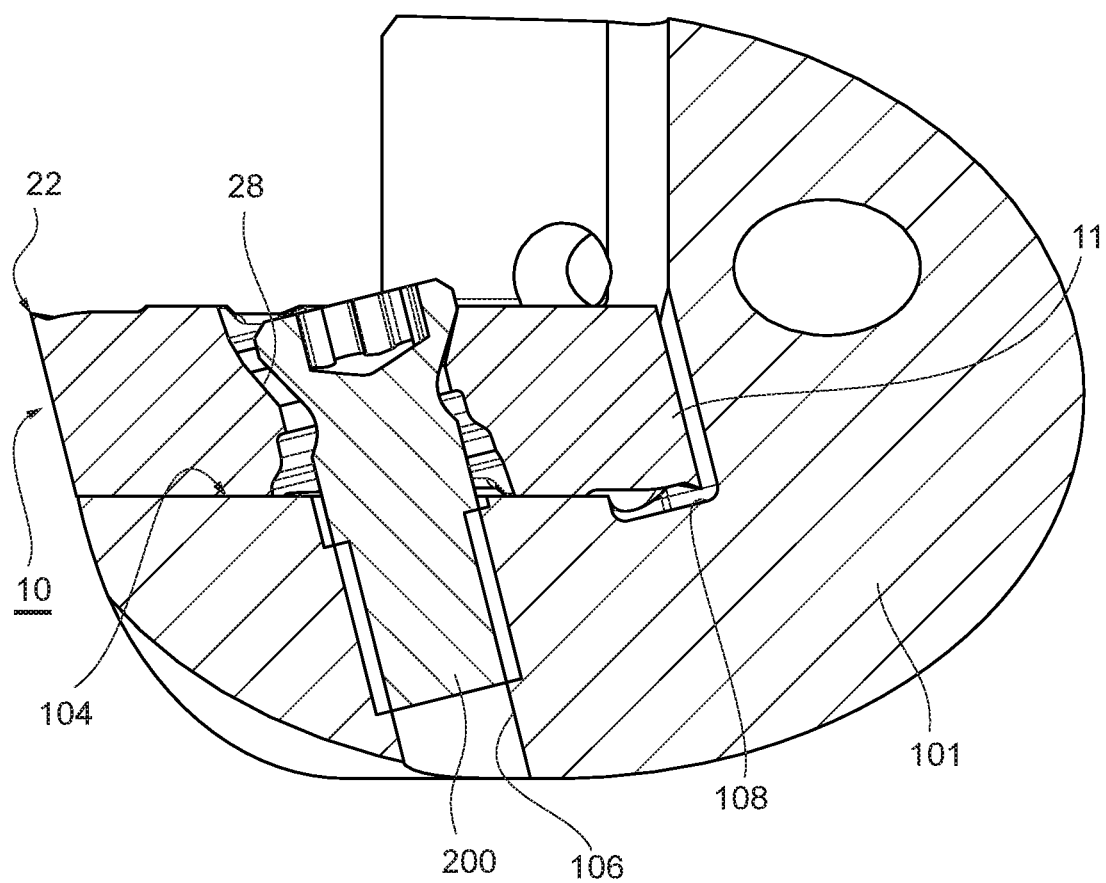
FIG. 13 is a sectional view showing the structure of the cutting insert in a state in which the cutting insert is fastened to the holder and the periphery of the cutting insert.

In the holder 101, a recessed section 108 for avoiding contact with the cutting edge 22 not in use is formed (see FIG. 13). It goes without saying that, after the cutting insert 10 is reversed, contact of the cutting edge 22 after use with the holder 101 is also avoided by the recessed section 108.

Figure 14:
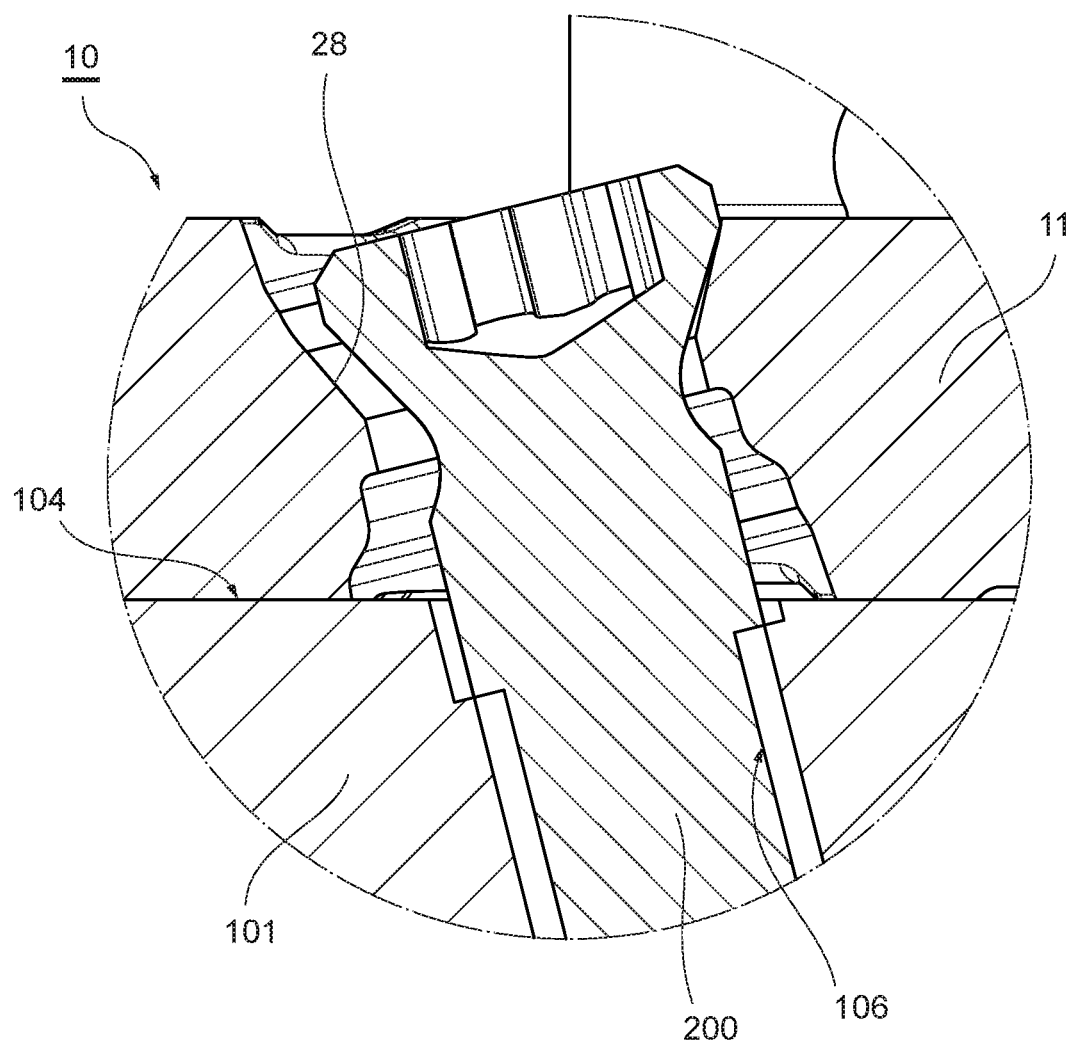
FIG. 14 is an enlarged view of a hole and a peripheral portion of the hole in FIG. 13.

In the cutting insert 10, a hole 28 piercing through both the end faces 12 and 14 in the thickness direction of the cutting insert 10 is formed. In this embodiment, an axis A extending to pierce through the two end faces 12 and 14 perpendicularly and pierce through the center position of the insert main body 11 is set (see FIG. 3 and the like). The center axis of the hole 28 coincides with a center axis C inclining with respect to the axis A. When the hole 28 is provided to incline with respect to the front surface 18 and the rear surface 20 of the insert main body 11, unless the tilt of the hole 28 is matched with a tilt of a screw hole (a fastening hole) 106 of the holder 101, the insert main body 11 cannot be attached to the holder 101 (see FIGS. 13 and 14). As a result, it is possible to prevent the cutting insert 10 from being attached to the holder 101 in a wrong state, in other words, it is possible to prevent occurrence of an easy mistake during attachment of the cutting insert 10. The tilt is, for example, in a range of 5° or more and 20° or less.

Figure 11:
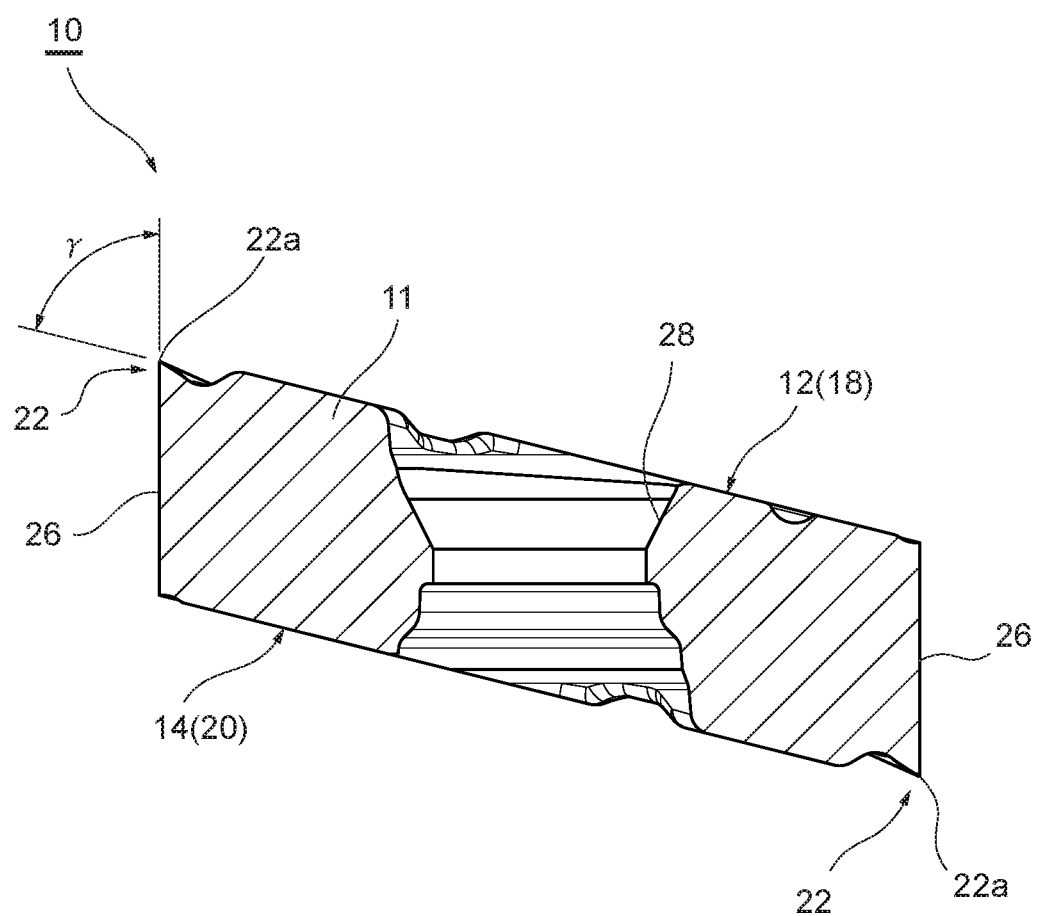
FIG. 11 is a sectional view showing a shape example of the cutting insert on a bisecting plane B passing through the center of respective cutting edges on the front surface and the rear surface of an insert main body.

The center axis C is set in parallel to at least any one of the peripheral side surfaces 16. The cutting insert 10 in this embodiment is configured such that the center axis C is parallel to all of the peripheral side surfaces 16 (see FIGS. 3, 4, and 11). However, this is only a preferred example. Besides, for example, the center axis C may be parallel to a part of the peripheral side surfaces 16. This includes a case in which, for example, when not all of the peripheral side surfaces 16 are planes and a part of the peripheral side surfaces 16 includes a curved surface, the center axis C is parallel to (a tangential line of) a part of the peripheral side surface 16.

As in the cutting insert 10 in this embodiment, when the opposing peripheral side surfaces 16 are configured by two sets of surfaces parallel to each other (even when not completely parallel, may be in a state approximate to the complete parallelism; in the following explanation, it is assumed that parallelism includes such a state) and the center axis C of the hole 28 is set in parallel to the peripheral side surfaces 16, it is possible to prevent the thickness around the hole 28 from becoming extremely small. That is, in the cutting insert having the taper shape of the trapezoidal shape in side view in which the areas of the front surface and the rear surface are greatly different, the cutting insert is reduced in the width direction to be gradually narrower as insert thickness is increased. It is difficult to sufficiently secure the thickness around the hole. Therefore, there is a limit in the increase in the thickness. On the other hand, in this embodiment, the thickness around the hole 28 can be fixed or set in a state with an extremely small change. Therefore, it is easy to increase the insert thickness of the cutting insert 10. The rigidity of the cutting insert 10 with the increased insert thickness increases, and the cutting insert 10 is less easily fractured, for example. Such a cutting insert 10 can solve a problem of a shift of the cutting insert during cutting by strengthening a fastening force (see FIGS. 13 and 14). Such a cutting insert 10 can also solve a problem in that tool rigidity of a multifunction tool for enabling drilling internal turning and external turning is low compared with that of a single-function tool (an insert holding force during drilling of the multifunction tool is low compared with that of the single-function tool). With such a cutting insert 10, it is also possible to control or optimize the insert thickness with respect to the cutting edge as appropriate.

Boss surfaces 30 are present on the front surface 18. These boss surfaces 30 are present higher than the arcuate cutting edge 22a and the linear cutting edges 22b and present on the same plane. That is, when a plane (hereinafter, center plane) M orthogonal to the axis A and passing through the peripheral side surface 16 to equally vertically divide the cutting insert 10 into two is defined (see FIGS. 3 and 4), the distance between the boss surfaces 30 and the center plane M is longer than the distance between the cutting edge 22 including the arcuate cutting edge 22a and the linear cutting edges 22b and the center plane M. All of the boss surfaces 30 extend on a plane parallel to the center plane M.

A chip breaker protrusion section (hereinafter simply referred to as protrusion section as well) 32 is formed in an inner side region of the arcuate cutting edge 22a and the linear cutting edges 22b on the front surface 18. A surface 32a of the protrusion section 32 facing the cutting edge 22 side and the rake face 24 demarcate and form, on the front surface 18, a recessed section 34 extending along the cutting edge 22. The recessed section 34 can be called chip breaker groove. The surface 32a of the protrusion section 32 is a wall surface standing from the recessed section 34, and is therefore hereinafter referred to as standing wall surface (hereinafter sometimes simply referred to as wall surface). The rake face 24 and the wall surface 32a extend along substantially the entire cutting edge 22 to have the recessed section 34 in a cross section orthogonal to the cutting edge 22 in any portion of the cutting edge 22.

The wall surface 32a is a surface extending such that the wall surface 32a and the rake face 24 form a recessed section along the cutting edge 22. The wall surface 32a includes a first wall surface 32a1 and a second wall surface 32a2 (see FIG. 6 and the like).

Figure 7:
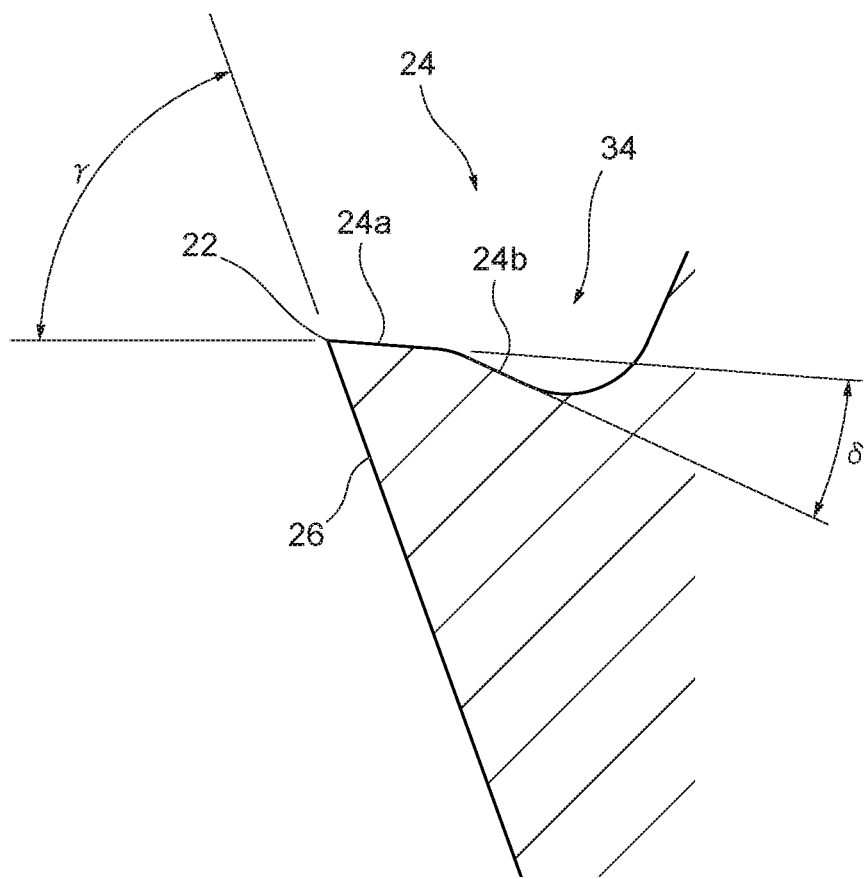
FIG. 7 is a partial sectional view of the cutting insert taken along a VII-VII line in FIG. 2.

A first rake face 24a has a fixed angle γ with respect to the flank 26 between the front surface 18 or the rear surface 20 and the peripheral side surface 16 in a position on the bisecting plane B (the vertical cross section of the cutting edge 22 of the cutting insert 10), which is the vertical cross section of the insert main body 11, passing through the center of the arcuate cutting edges 22a of the respective cutting edges 22 on the front surface 18 and the rear surface 20 of the insert main body 11. A preferred range of the angle γ is, for example, 60° to 87° and a more preferred range of the angle γ is, for example, 76° to 85° (see FIG. 11). In this embodiment, the angle γ is 76° at an intersection of the cutting edge 22 of the cutting corner section 18c and the bisecting plane B (see FIG. 7).

The cutting corner section 18c includes a second rake face 24b in addition to the first rake face 24a. The second rake face 24b has a predetermined angle δ, for example, an angle of 5° to 20° with respect to the first rake face 24a in the vertical cross section of the cutting edge 22 and extends on the rake face 24 (see FIG. 7).

In the recessed section 34, a surface extending from the arcuate cutting edge 22a and the linear cutting edges 22b toward the bottom section of the recessed section 34 forms the rake face 24. The rake face 24 is an inclined surface tilting to gradually sink downward, that is, approach the center plane M as the inclined surface is further away from the cutting edge 22 to the inner side. In this way, the rake face 24 is formed to have a positive rake angle.

The rake face 24 is substantially configured from two surfaces. The rake face 24 includes the first rake face 24a and the second rake face 24b disposed in order in a direction away from the cutting edge 22 in a direction orthogonal to the cutting edge 22. The first rake face 24a is one region of the rake face 24 and is a first region of the rake face 24. The second rake face 24b is another region of the rake face 24 and is a second region of the rake face 24.

The cutting insert 10 in this embodiment has an inscribed circle dimension of, for example, approximately 6 mm (6.3 mm), thickness of approximately 3 mm (2.8 mm), a corner radius of approximately 0.4 mm, and a hole diameter of approximately 2 mm. However, it goes without saying that these dimensions are an example of specific dimensions of the cutting insert 10.

Further, the vicinity of a tip of the cutting insert 10 in this embodiment is formed in a shape that can be used for machining of an inner diameter, an outer diameter, and an end face and drilling. The cutting insert 10 is configured to be capable performing drilling and turning with the same cutting edge. This configuration is explained below (see FIG. 9 and the like).

Figure 8:
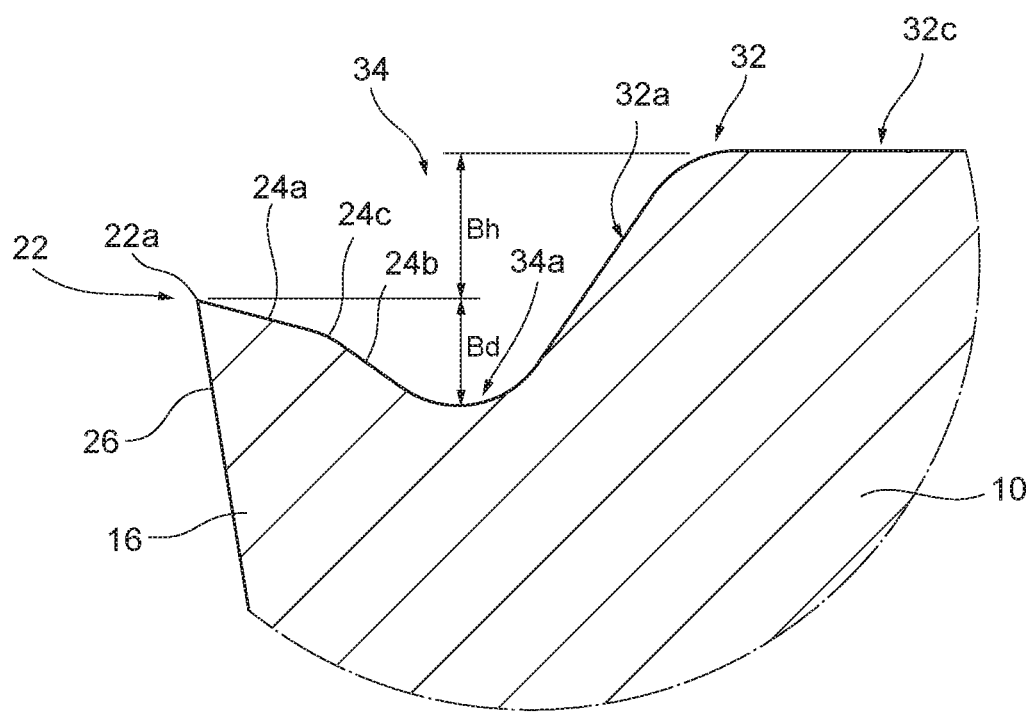
FIG. 8 is an enlarged view of a partial cross section of the cutting insert.

In this specification, the distance (a dimension or height) between the arcuate cutting edge 22a of the cutting edge 22 and a bottom section (a deepest section) 34a of the recessed section 34 in a direction perpendicular to the center plane M of the cutting insert 10 (in other words, a direction parallel to the axis A) is referred to as breaker depth and indicated by a sign Bd (see FIG. 8). The distance (a dimension or height) between the arcuate cutting edge 22a of the cutting edge 22 and the upper end of the second wall surface 32a2, that is, the protrusion section 32 in the direction perpendicular to the center plane M is referred to as breaker height and indicated by a sign Bh (see FIG. 8).

The standing wall surface 32a in the cutting insert 10 in this embodiment is formed as explained below. That is, since the second rake face 24b is formed, the breaker height Bh is height with which a chip Z during drilling is guided to the outer side of the second wall surface 32a2 (see FIG. 9) and the breaker depth Bd is depth with which the chip Z during turning is guided to enter the recessed section 34 (see FIG. 10). As the breaker height Bh for realizing such a function, a preferred numerical value range is 0.1 mm to 0.8 mm and a more preferred range is 0.3 mm to 0.5 mm. By increasing the breaker depth Bd with the second rake face 24b, it is possible to reduce the breaker height Bh concerning the chip Z during drilling while retaining the breaker depth Bd equivalent to that in the shape in the past concerning the chip Z during turning rather than easily reducing the height of the protrusion section 32 (see FIGS. 9 and 10). In treating the chip z, basically, the reduction in the breaker height Bh takes effect as explained above. The breaker depth Bd is an auxiliary parameter. Relative height increases when the chip Z is drawn into the recessed section 34.

By forming the rake face 24 in a two-stage configuration including the first rake face 24a and the second rake face 24b and reducing the relative height of the protrusion section 33, it is possible to realize a configuration in which the breaker height Bh can be further reduced than in the structure in the past. Consequently, it is possible to improve a discharge property of the chip Z during drilling (see FIG. 9) without hindering a treatment property of the chip Z during turning (see FIG. 10). In this embodiment, only the vicinity of the cutting corner section 18c is formed as a two-stage rake face having a large rake angle such that the protrusion section 32 works only in turning in which only the cutting edge 22 in the vicinity of the cutting corner section 18c is used. That is, since the recessed section 34 is easily deepened (the breaker depth Bd is easily increased) by the second rake face 24b, even at the same height of a breaker protrusion (i.e., even if the breaker height Bh is the same as that in the past), the same effect as in the case in which the height of a chip breaker groove is increased can be relatively obtained. A specific numerical value range for the vicinity of the cutting corner section 18c is absent. A specific range of the "vicinity" can change according to the structure of the cutting insert 10, a form of cutting, a cutting target, and the like. As only an example, the "vicinity" is a range in which the distance from the cutting corner section 18c is 1 mm or less. However, if the treatment property of the chip Z during turning is not hindered and the discharge property of the chip Z during drilling can be improved as explained above, the range of the "vicinity" is not limited to a specific certain numerical value range.

In general, the protrusion section 33 is formed in a shape for discharging the chip Z in an optimum state. In the cutting insert (the cutting tool) in the past, usually, the chip Z during drilling and the chip Z during turning (hole widening) trace the same route and hit a chip breaker. In this regard, in this embodiment, a shape that can control whether the chip Z hits a surface configuring the chip breaker (the standing wall surface 32a), in other words, whether the chip Z enters the recessed section (the chip breaker groove) 34 (in other words, a shape that can select whether a wall surface is used) in drilling and turning is realized. Specifically, as it is evident from the above explanation, in the cutting insert 10 in this embodiment, the breaker depth Bd is larger and the breaker height Bh is smaller than those in the structure in the past. The breaker depth Bd is, for example, 0.05 mm to 0.5 mm and preferably 0.08 mm to 0.2 mm.

From a view point of more finely cutting the chip Z during turning, the recessed section 34 may be configured such that the distance from the cutting edge 22 to the standing wall surface 32a in the horizontal direction in this specification decreases. If the distance is short, the chip Z easily hits the standing wall surface 32a even when cutting conditions are changed.

Corresponding conditions are mainly depth of cut ap and feed f. The short distance from the cutting edge 22 to the standing wall surface 32a in the horizontal direction is advantageous when "the depth of cut ap is small" and when "the feed f is small".

Figure 12:
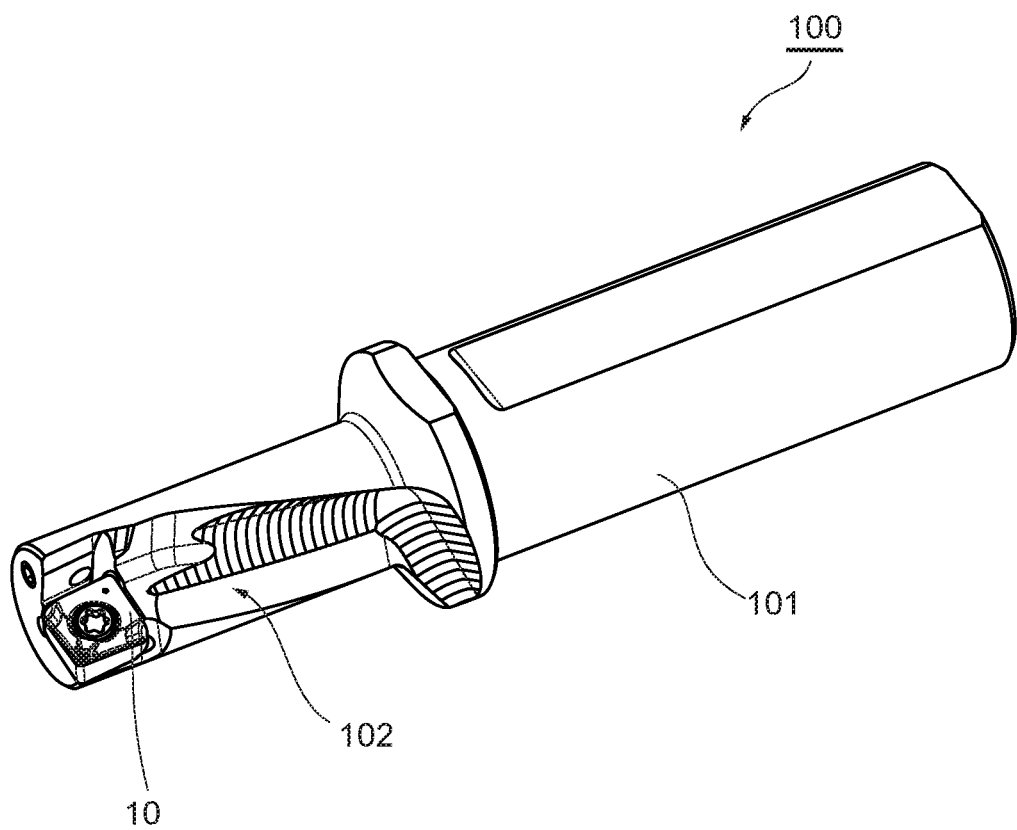
FIG. 12 is a diagram showing an example of a holder mounted with the cutting insert.

The cutting insert 10 explained above is detachably mounted on the insert attachment seat 104 provided in the holder 101 (see FIG. 12). The cutting insert 10 is mounted on the insert attachment seat 104 with the rear surface 20 and at least a part of the peripheral side surfaces 16 having a function of a seating surface respectively set in contact with the bottom surface and the wall surface of the insert attachment seat 104. The screw hole 106 is formed in the insert attachment seat 104. A screw 200 engaging in or piercing through the hole 28 of the cutting insert 10 is screwed in the screw hole 106 of the insert attachment seat 104, whereby the cutting insert 10 is detachably fixed to the holder 101.

The holder 101 includes a chip discharge groove 102 to enable drilling (see FIG. 12). A junk diameter of the holder 101 (an inner diameter of a corresponding sleeve) is, for example, approximately 20 mm. Machining of an inner diameter, an outer diameter, and an end face and drilling can be performed by fixing the holder 101 to a machine tool via the sleeve.

An attaching mechanism or means for attaching the cutting insert 10 to the holder 101 is not limited to such a configuration. Other mechanical or chemical mechanisms or means can be adopted as the attaching mechanism or means.

In the case of the both-side usable cutting insert 10, both of opposing end faces of which are selectively used as the front surface, one end face (the end face 12 or the end face 14) can come into contact with the bottom surface of the insert attachment seat 104.

In the cutting insert 10 mounted on the holder 101, during cutting, the front surface 18 is directed to a rotating direction of work. At this time, the cutting edge 22 on an axial direction distal end side is used as a main cutting edge in drilling, internal turning and external turning. The cutting edge 22 extending in the outer circumferential direction is used as the main cutting edge in end face machining. During this cutting, the remaining portion not functioning as a lateral cutting edge of the other linear cutting edge 22b of the acting cutting edge 22 and the arcuate cutting edge 22a adjacent to the other linear cutting edge 22b functions as a front cutting edge facing a machining surface side of a material to be cut. The acting cutting edge is a portion cut into the material to be cut in the cutting edge 22, that is, a cutting edge that can be involved in cutting in the cutting tool on which the cutting insert 10 is mounted.

The cutting insert 10 is fed in, for example, a direction parallel to a rotation center line of the material to be cut and is used to turn the outer circumferential surface of the material to be cut that rotates around the rotation center line. In this case, the lateral cutting edge can come into contact with the material to be cut over the entire depth of cut in a direction perpendicular to the rotation center line (a cut-in direction) and mainly perform cutting. In this case, the front cutting edge can come into contact with a machining surface of the material to be cut and perform formation of the machining surface.

In the cutting explained above, the chip Z mainly formed by the lateral cutting edge of the cutting insert 10 flows from the lateral cutting edge toward the standing wall surface 32a side. At this time, the chip Z passes on the first rake face 24a while being in contact with the surface of the first rake face 24a (see FIG. 10 and the like).

Figure 9:
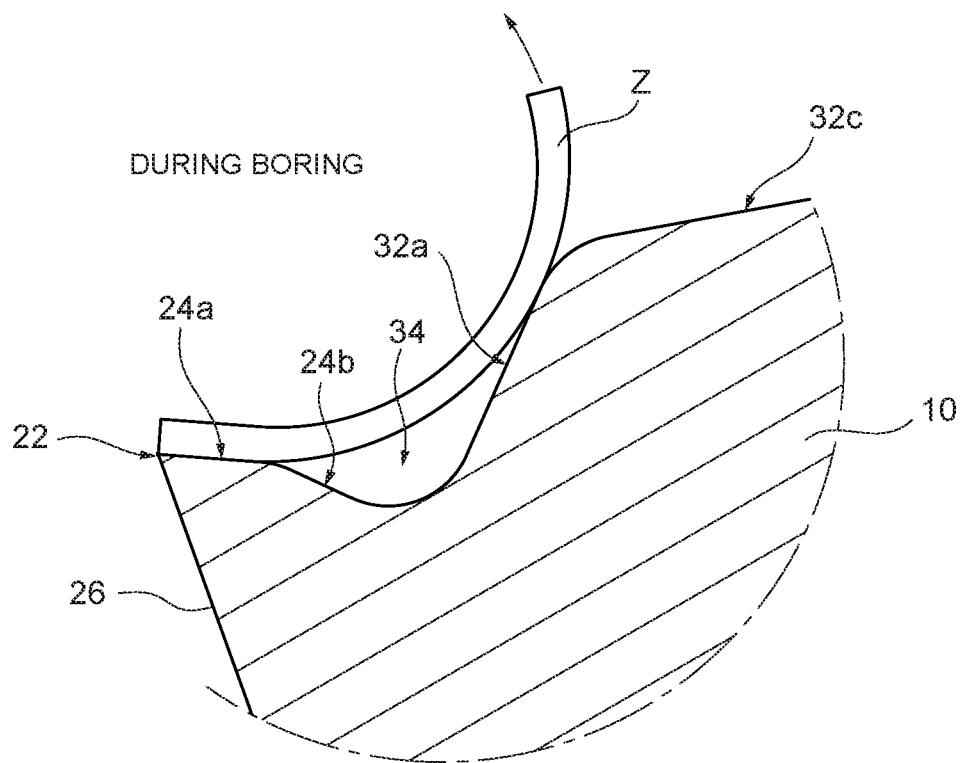
FIG. 9 is a partial sectional view of the cutting insert for explaining a state of chips during drilling.
Figure 10:
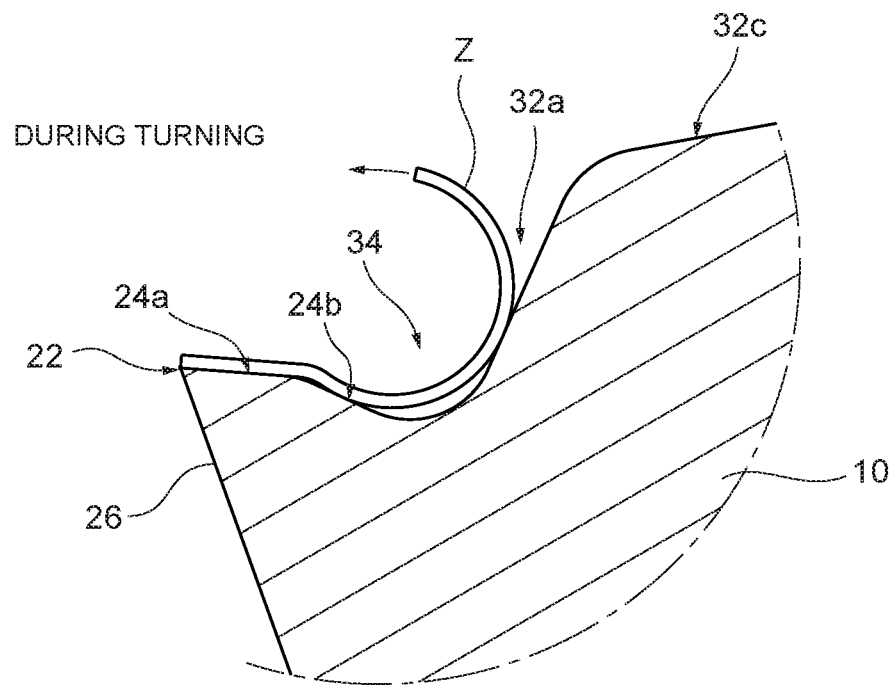
FIG. 10 is a partial sectional view of the cutting insert for explaining a state of a chip during turning.

In the cutting insert 10, which is the multifunction tool, in addition to the operational effects described above, chip treatment sometime can be performed without bringing the chip Z into contact with the second rake face 24b by setting a rake angle of the second rake face 24b larger than a rake angle of the first rake face 24a as in this embodiment (see FIG. 9). In that case, such a configuration of the rake face further contributes to a reduction in cutting resistance. Therefore, it is possible to prevent heat generation of the cutting insert and the chip Z. In this case, since a contact area of the chip Z and the cutting insert is small, it is possible to prevent heat generated in the chip Z from being propagated to the cutting insert. Therefore, it is possible to prevent an increase in a surface temperature of the cutting insert.

On the other hand, when the rake angle of the rake face 24 is simply increased, in general, edge tip strength decreases. On the other hand, in the cutting insert 10 in this embodiment, the size of the first rake face 24a (length from the cutting edge 22) is reduced. The second rake face 24b having a larger rake angle is formed adjacent to the first rake face 24a. Therefore, it is possible to minimize the decrease in the edge tip strength.

The chip Z passed on the first rake face 24a flows onto the second rake face 24b. A rake angle $\alpha b$ of the second rake face 24b is larger than a rake angle $\alpha a$ of the first rake face 24a. That is, the rake face 24 assumes a convex shape. Therefore, the chip Z flowing from the first rake face 24a to the second rake face 24b cannot actively or substantially come not contact with the surface of the second rake face 24b. Accordingly, a temperature rise of the chip Z is prevented. Frictional resistance between the chip Z and the rake face is greatly reduced. Therefore, it is possible to improve a tool life of the cutting insert.

The cutting insert 10 according to the embodiment of the present invention is explained. However, various changes can be applied to the cutting insert 10. The shapes of the front surface and the like of the cutting insert 10 is not limited to the rhombus and can be changed to substantial polygons such as a square, a rectangle, a parallelogram, and a triangle. That is, the cutting insert 10 can have a substantially polygonal plate shape. The cutting insert 10 can be manufactured from various materials. At least a part of the arcuate cutting edge and the linear cutting edges is desirably configured from hard materials such as an ultrahard alloy, cermet, and ceramic or ultrahigh-pressure sintered bodies such as a diamond sintered body and a cubic boron nitride sintered body or materials obtained by coating the hard materials or the ultrahigh-pressure sintered bodies with a covering film, an amorphous carbon thin film, or the like selected out of a group consisting of a carbide, a nitride, an oxide, a carbonitride, a carbonate, a carbon oxynitride, a boride nitride, and a boron carbon oxynitride of periodic table 4A, 5A, and 6A group metals, aluminum oxide, and titanium aluminum nitride with a CVD method, a PVD method, and the like.

The second rake face 24b explained in the embodiment is not limited to the plane and may be configured of, for example, a curved surface not having a fixed rake angle (e.g., a curved surface such as a cylindrical surface). Similarly, the first rake face 24a explained in the embodiment is not limited to the plane either and may be configured from, for example, a curved surface not having a fixed rake angle (a modification explained below, see FIG. 14).

The shapes of the protrusion section 32 and the surface 32a (the first wall surface 32a1 and the second wall surface 32a2) can be variously changed according to target cutting conditions.

The present invention is suitably applied to a cutting insert used for cutting and a cutting tool body including the cutting insert.

What is claimed is:

1. A cutting insert used for both drilling and turning with the same cutting edge, the cutting insert comprising:
    an insert main body having a front surface and a rear surface, the outline shapes of which are parallelogram shapes;
    peripheral side surfaces disposed on four sides of the insert main body;
    cutting edges provided on respective intersecting ridge lines between the front surface and the peripheral side surface and between the rear surface and the peripheral side surface of the insert main body;
    a hole provided in the insert main body to incline with respect to the front surface and the rear surface, the hole being usable for attachment; and
    a rake face which has an inclined surface tilting to gradually sink downward below a respective one of the cutting edges, the rake face having a positive rake angle;
    wherein the rake face comprises two surfaces including a first rake face and a second rake face, which are disposed in order in a direction away from the respective cutting edge in a direction orthogonal to the respective cutting edge;
    wherein the second rake face extends downward in the direction away from the respective cutting edge to a bottom section of a recessed section below the second rake face, and the bottom section extends upward in the direction away from the respective cutting edge to a standing wall surface immediately adjacent to the bottom section that is inclined away from the respective cutting edge and extends above the respective cutting edge;
    wherein a chip formed during drilling is guided by the first rake face along substantially an entirety of the cutting edge to a portion of the standing wall surface above the respective cutting edge without contacting the second rake face, and a chip formed during turning is guided by the second rake face along substantially the entirety of the cutting edge to the recessed section; and
    wherein an axis of the hole inclining with respect to the front surface and the rear surface is parallel to at least one of the peripheral side surfaces or a portion of the peripheral side surfaces.

2. The cutting insert according to claim 1, wherein the axis is parallel to all of the peripheral side surfaces.

3. The cutting insert according to claim 1, wherein the cutting edge is disposed point-symmetrically about a position of a center of the insert main body.

4. The cutting insert according to claim 3, wherein an angle formed by the front surface or the rear surface and each of the peripheral side surfaces is 76° to 85° in a vertical cross section passing through a center of arcuate cutting edges respectively provided on the front surface and the rear surface of the insert main body.

5. The cutting insert according to claim 4, having a chip breaker protrusion section in an inner side region of the arcuate cutting edge and linear cutting edges on the front surface.

6. The cutting insert according to claim 3, wherein the cutting edge forms an angle of 3° to 15° with respect to the front surface or the rear surface in a vertical view of a vertical cross section of the insert main body passing through a center of cutting edges respectively provided on the front surface and the rear surface of the insert main body.

7. The cutting insert according to claim 1, wherein the opposing peripheral side surfaces are surfaces parallel to each other.

8. The cutting insert according to claim 1, wherein at least two sides have a shape functioning as the cutting edge in a plan view perpendicular to the front surface or a bottom view perpendicular to the rear surface.

9. A holder to which the cutting insert according to claim 1 can be attached.

10. A cutting tool comprising the cutting insert according to claim 1.

11. The cutting insert according to claim 1, wherein substantially an entirety of one side of the cutting edge is used as the cutting edge during drilling, and substantially the entirety of the one side of the cutting edge and substantially an entirety of an other side of the cutting edge adjacent to the one side of the cutting edge are used as the cutting edge during turning.

* * * * *